UNITED STATES PATENT OFFICE.

MELCHOR MARSA, OF NEW YORK, N. Y., ASSIGNOR TO THE INTERNATIONAL CORK COMPANY, OF BROOKLYN, NEW YORK, A CORPORATION OF NEW YORK.

ARTIFICIAL CORK.

1,152,193.     Specification of Letters Patent.     Patented Aug. 31, 1915.

No Drawing.     Application filed September 24, 1913. Serial No. 791,670.

*To all whom it may concern:*

Be it known that I, MELCHOR MARSA, a subject of the King of Spain, and resident of the city of New York, in the county of Kings and State of New York, have invented certain new and useful Improvements in Artificial Cork, of which the following is a specification.

The present invention relates to a composition of matter designed particularly as a substitute for cork, that is especially adapted for use in connection with bottle closures of the cap variety. It pertains furthermore to a method of making such substance.

In closures of this type a packing disk of cork is ordinarily made use of. But, inasmuch as there are many defects in the natural cork wood, for instance those resulting from the presence of insect life therein, and since there are veins running through the natural cork, and as the disks are comparatively thin and the veins mentioned sometimes very deep, it is almost impossible to cut disks which are impermeable to gases and liquids. Due to this fact the disks have to be subjected, after cutting, to further treatment so as to make them impermeable. For these reasons and also because the natural supply of cork wood is growing all the time scarcer, it has been long sought to produce a substitute or artificial cork which lacks the defects above mentioned of the natural cork, but otherwise has all the peculiar characteristics of the same. While it has been comparatively easy to produce a composition of matter to be shaped and used as bottle stoppers or articles of like great dimensions, it has been found almost impossible to prepare a compound of which disks for closures of the type above mentioned could be made, which have the characteristics of the natural cork wood and are free from the objections above stated. For instance, the binding material of some of these disks is odorous and objectionable on that ground; in other cases it is permeable to liquids or gases containing alcohol; still in other cases it is affected by heat and rendered to a large extent soluble, thus making the packing useless, and contaminating, on the other hand, the liquid contents of the bottle. Other binding materials are coagulated by the aid of chemicals, which act upon the liquid contents of the bottles to which the closures are applied, thus causing the contents to be injurious to the health of the consumer. Finally, in most, if not in all of the compositions heretofore in use, the binding material is mixed with the cork or similar granules under conditions which prevent an intimate union between these two ingredients.

The main object of the present invention is to produce a composition of matter of which disks for closures of the type above mentioned can be made, which are free from the objections above named and also from others hereinafter to be stated.

Another object of the invention is to provide a simple process for the preparation of such compound, whereby the cost of production thereof is greatly reduced, thereby resulting in a cheapness of the final product.

With these and other objects in view, the invention consists in the composition of matter and the method of making the same hereinafter fully described and pointed out in the appended claim, it being obvious that while herein specified proportions of the ingredients of the composition are stated, several changes may be made within the scope of the appended claim without departing from the spirit or sacrificing any of the advantages of the invention.

The invention consists in reducing the cork or other ligneous substance to a finely divided condition of granular form, heating the said granules and mixing with the same a suitable binder in liquid form, said binder being adapted to be coagulated and rendered insoluble by heat, and finally subjecting the composition to heat and pressure in molds.

The cork or other ligneous substance, preferably, waste cork or other waste ligneous material, is granulated by any suitable means, and subjected to treatment with a view to remove the impurities therefrom. After this treatment, the granules are bleached, if found necessary, and heated to a temperature of about 110° Fahrenheit. Cork wood consists of thin walled cells filled with air and is destitute of intercellular spaces. In subjecting such material to heat, the air in the cells thereof expands and increases the volume of the granules. The uneven, broken surfaces of the granules increase thus in roughness and present large surfaces to the liquid binding material with which they are mixed in a manner hereinafter described. Moreover, the heated granules mix easier with the binding material than if they were of the temperature of the latter.

The binding material consists of the blood of animals which has been freed from its fibrin, for instance by whipping the fresh blood as it flows from the animal with twigs. This defibrinated substance, which retains its liquid state for a considerable time, is mixed with turpentine, which acts as a preservative, and on account of its oxygen absorbing properties, when exposed to the air and at the same time bleaches the defibrinated substance to some extent. Glycerin is then added to the mixture, said glycerin serving mainly to soften the cork granules which are under ordinary circumstances dry and hard. The ingredients of the liquid are thoroughly mingled by agitation, and added to the heated cork granules, in which they are thoroughly incorporated in any suitable manner. The compound is then left to dry at a low temperature of about 75° Fahrenheit or less, the same being allowed to stand until a nearly dry mass is obtained. Obviously if the blood were not preserved, it would easily decay while thus standing, rendering the compound useless. The material is then put, for instance, into cylindrical molds, the diameters of which are equal to those of the cork disks to be manufactured, and subjected to pressure, after which the molds with the compound therein are submitted to a temperature of about 240° Fahrenheit for about an hour in dry heat, which coagulates the binding material and at the same time renders it insoluble. The rods so obtained are then removed from the molds and cut to disks by any suitable means. Obviously other molds may be used just as well.

Preferably, the ingredients are combined in the proportions stated, viz:

Cork granules _____ 48 parts by weight
Defibrinated blood _____ 28 parts by weight
Oil of turpentine _____ 1 part by weight
Glycerin _____ 12 parts by weight It is to be observed that the effect of the heat upon the mass is to render the liquid ingredients of the composition impermeable to liquids and gases and insoluble, the pressure serving to produce a non-porous body, the binding material filling completely the interstices between the cork or other ligneous granules.

Owing to the low cost of the ingredients and the simple process, a comparatively cheap product is obtained which successfully competes with disks made of natural corkwood. It does not disintegrate, is neither affected by boiling or alcohol, is tasteless and inodorous, and has ample elasticity and tenacity.

What I claim is:—

An artificial cork composed of a granular base, and a binding material containing defibrinated blood rendered insoluble, and turpentine and glycerin mixed therewith.

Signed at New York, in the county of New York, and State of New York, this 18th day of September, A. D. 1913.

MELCHIOR MARSA.

Witnesses:
SIGMUND HERZOG,
S. BIRNBAUM.